US008839282B2

(12) United States Patent
Kosciewicz (10) Patent No.: US 8,839,282 B2
(45) Date of Patent: Sep. 16, 2014

(54) MULTIMEDIA TEST SYSTEMS (75) Inventor: Pawel Kosciewicz, Dublin (IE)

(73) Assignee: Level 3 Communications, LLC, Broomfield, CO (US)

( * ) Notice: Subject to any disclaimer, the term of this patent is extended or adjusted under 35 U.S.C. 154(b) by 247 days.

(21) Appl. No.: 13/081,929

(22) Filed: Apr. 7, 2011

(65) Prior Publication Data

US 2012/0260277 A1 Oct. 11, 2012

(51) Int. Cl.
| H04N 7/16 | (2011.01) |
| H04N 17/00 | (2006.01) |
| H04N 17/02 | (2006.01) |
| H04N 19/139 | (2014.01) |
| H04N 1/00 | (2006.01) |
| H04N 19/51 | (2014.01) |
| H04N 7/167 | (2011.01) |
| G06K 9/03 | (2006.01) |

(52) U.S. Cl.
CPC ............ *H04N 17/004* (2013.01); *H04N 17/02* (2013.01); *H04N 19/00151* (2013.01); *H04N 1/00005* (2013.01); *H04N 19/00684* (2013.01); *H04N 20/14* (2013.01)
USPC ............... 725/14; 725/31; 348/180; 348/184; 348/185; 348/189; 382/309

(58) Field of Classification Search
CPC . H04N 17/004; H04N 17/02; H04N 1/00005; H04N 19/00151; H04N 19/00684
USPC .............. 725/14, 31; 348/180, 184, 185, 189; 382/309
See application file for complete search history.

(56) References Cited

U.S. PATENT DOCUMENTS

| 5,504,522 A | 4/1996 | Setogawa |
| 6,918,005 B1* | 7/2005 | Marchant et al. ............. 711/113 |
| 2002/0047902 A1* | 4/2002 | Thomas et al. ............... 348/180 |
| 2005/0166094 A1* | 7/2005 | Blackwell et al. ............. 714/38 |
| 2006/0099923 A1* | 5/2006 | Wildhagen ................ 455/234.1 |
| 2006/0117379 A1* | 6/2006 | Bennett et al. .................... 726/3 |

(Continued)

FOREIGN PATENT DOCUMENTS

| WO | WO-2006077559 A2 | 7/2006 |
| WO | WO-2008119924 A1 | 10/2008 |

OTHER PUBLICATIONS

"International Search Report, dated Jan. 27, 2012, Intl Appl. No. PCT/EP11/055428", Intl Filing Date Apr. 7, 2011, , 5 pgs.

(Continued)

*Primary Examiner* — Hoang-Vu A Nguyen-Ba (57) ABSTRACT

A system for monitoring the quality of DRM-protected multimedia data streams, the system comprising at least one computer having a network connection to receive at least one said DRM-protected multimedia data stream, program memory, working memory, and a processor coupled to said program memory, working memory, and wherein said program memory stores processor control code for a media player for said multimedia data stream and code to control said processor to: play said DRM-protected multimedia data stream to provide at least a decrypted video data output stream for display on a monitor; capture still image data from a succession of still images from said video data output stream; process said still image data to detect greater than a threshold difference between at least two of said still images; and output fault data identifying a potential video quality fault responsive to absence of detection of said greater than a threshold difference.

22 Claims, 8 Drawing Sheets

(56) References Cited

U.S. PATENT DOCUMENTS

| | | | |
|---|---|---|---|
| 2007/0047542 A1 | 3/2007 | Thukral | |
| 2007/0058043 A1 | 3/2007 | Thukral | |
| 2008/0024665 A1* | 1/2008 | Nakoji | 348/558 |
| 2008/0196077 A1* | 8/2008 | Basse | 725/116 |
| 2010/0124399 A1* | 5/2010 | Sofos et al. | 386/46 |
| 2010/0318312 A1* | 12/2010 | Bhat et al. | 702/108 |

OTHER PUBLICATIONS

"Written Opinion, dated Jan. 27, 2012, Intl Appl. No. PCT/EP11/055428", Intl Filing Date Apr. 7, 2011, , 7 pgs.

International Preliminary Report on Patentability, dated Oct. 17, 2013, Int'l Appl. No. PCT/EP11/055428, Int'l Filing Date Apr. 7, 2011; 6 pgs.

* cited by examiner

| key | Value |
|---|---|
| log_id | 1124592 |
| stream_id | 2 |
| log_type | 0 |
| log_code | 102 |
| log_speed | 600k |
| log_imageH | 108 |
| log_imageW | 192 |
| log_path | http://10.8.20.191/monitor/logs/20110209/ |
| log_fileName | 20110209_111633_2 |
| log_playingCount | 1 |
| log_bufferingCount | 1 |
| log_playedFor | 26 |
| log_droppedImages | 0 |
| log_extraInfo | |
| log_motions | 0.4787 \| 0.8722 \| 0.8784 \| 0.527 \| 0.5533 \| 0.4722 \| 0.5222 \| 0.5537 |
| log_sounds | 0.0087 \| 0.0215 \| 0.011 \| 0.006 \| 0.005 \| 0.0235 \| 0.0081 \| 0.0202 \| 0.0123 \| 0.0062 \| 0.0065 \| 0.0157 \| 0.0047 \| 0.0403 \| 0.0173 \| 0.0099 \| 0.0089 \| 0.0406 \| 0.0197 \| 0.0215 \| 0.0163 \| 0.0017 \| 0.0011 \| 0.0016 |
| log_black | 18\|25\|93\|93\|17\|17\|12\|18\|22 |
| log_R | 61\|103\|214\|214\|78\|96\|76\|92\|86 |
| log_G | 57\|74\|204\|204\|74\|90\|69\|82\|75 |
| log_B | 52\|61\|201\|200\|63\|74\|57\|67\|59 |
| log_errors | |
| log_checks | 500 OK |
| log_status | 500 |
| log_motionState | 1 |
| log_soundState | 1 |
| log_BlackState | 2 |
| log_RGBState | 2 |
| log_BMSxml | |
| log_BMSState | 2 |
| log_audioTime | 8343:-1:1 \| 3000:1:1 \| 23062:-1:0 |
| log_grabTime | 2343:0:0\|3000:0:0\|3000:0:1\|3015:0:1\|3015:0:1\|3015:0:1\|3015:0:1\|3015:0:1\|3015:0:1\|3015:0:1\|1.0 |
| log_playTime | 1515:1:0\|6593:2:0\|15:4:1\|26234:8:0\|46:-1:0 |

Figure 7a

Dashboard | Checks | Status | Page refresh in: 0s
Extend

| Channel | Speed | << Status for 2011.02.09 11 >> |
|---|---|---|
| National Geographic(101) | 600k | ⊙⊙⊙⊙ |
| | 1200k | ⊙⊙⊙⊙ |
| | 1800k | ⊙⊙⊙⊙ |
| Nat Geo Wild(102) | 600k | ⊙⊙⊙⊙ |
| | 1200k | ⊙⊙⊙⊙ |
| | 1800k | ⊙⊙⊙ |
| Nick Jr(103) | 600k | ⊙⊙⊙ |
| | 1200k | ⊙⊙⊙⊙ |
| | 1800k | ⊙⊙⊙⊙ |
| Disney(104) | 600k | ⊙⊙⊙ |
| | 1200k | ⊙⊙⊙⊙ |
| | 1800k | ⊙⊙⊙⊙ |
| MTV One(106) | 600k | ⊙⊙⊗⊙⊙ |
| | 1200k | ⊙⊙⊙⊙ |
| | 1800k | ⊙⊙⊙⊗ |
| Nickelodeon(107) | 600k | ⊙⊙⊙⊙ |
| | 1200k | ⊙⊙⊙⊙ |
| | 1800k | ⊙⊙⊙⊙ |
| Eurosport UK(108) | 600k | ⊙⊙⊙ |
| | 1200k | ⊙⊙⊙⊙ |
| | 1800k | ⊙⊙⊙ |
| Sky News(109) | 600k | ⊙⊙⊙ |
| | 1200k | ⊙⊙⊙⊙ |
| | 1800k | ⊗⊗⊙⊙⊙ |
| Gold(111) | 600k | ⊙⊙⊙ |
| | 1200k | ⊙⊙⊙ |
| | 1800k | ⊙⊙⊙⊙ |
| Eden(112) | 600k | ⊙⊙⊙⊙ |
| | 1200k | ⊙⊙⊙ |
| | 1800k | ⊙⊙⊙⊙ |
| ESPN Classic(113) | 600k | ⊙⊙⊙⊙ |
| | 1200k | ⊙⊙⊗⊙⊙ |
| | 1800k | ⊙⊙⊙⊙ |
| | 600k | ⊙⊙⊙⊙ |

MULTIMEDIA TEST SYSTEMS

FIELD OF THE INVENTION

This invention relates to systems, methods and computer readable media for monitoring the quality of multimedia datastreams, in particular DRM (digital rights management)—protected multimedia datastreams. The techniques we describe are especially useful for monitoring television programs 'broadcast' over the internet.

BACKGROUND TO THE INVENTION

It is known to monitor video quality by using human observers watching multiple television screens.

The last few years have seen a considerable increase in the demand for online video delivery. An internet broadcast ecosystem has developed comprising, in particular, major video service providers, content owners and media-rights holders. This provides a capability to encode, encrypt and DRM (Digital Rights Management)-protect media, insert adverts, switch to different sources, provide blackout management slates, deliver licenses and so forth. End customers use a wide range of live and on-demand media formats and platforms including, for example, Windows Media, Silverlight Smooth Streaming, Adobe Flash, Apple HTTP Streaming (all Registered Trade Marks).

Typically an online video is usable at one or more bitrates. The end user can choose a preferred bit rate or a player can detect the bandwidth and automatically switch between bitrates to provide continuous media playback. Some users broadcast live television programs; they can require a high quality of service and may have aggressive SLA's (Service Level Agreements).

A carrier of internet traffic is expected to quickly detect, assess and resolve any issues that may occur between source and end client, and this creates a demand for a reliable way of continuous monitoring of media.

In one approach, to monitor the service a person is assigned to constantly watch perhaps 100 channels on a video wall, looking for potential issues. However this is expensive and potentially unreliable and it is desirable to find a better solution. The problem is exacerbated because an average channel has from 3 to 6 bitrates and it is desirable to check each separately (is possible for a video encoder to have a fault at one streaming bit-rate only).

An approach from Nagios Enterprises, LLC dumps data files every few seconds and checks the size of the data file. This facilitates identifying problems with connectivity and accessibility, but further automating video monitoring is a difficult problem. This is particularly the case where a multimedia datastream is protected by digital rights management as this constrains the processing of the data—for example the storage of the decrypted data may not be permitted as video generally has copy protection and can only be played a computer that has a valid license. Further, video secured using DRM can generally only be accessed when there are no debugging tools running.

SUMMARY OF THE INVENTION

According to a first aspect of the invention there is therefore provided a system for monitoring the quality of DRM-protected multimedia data streams, the system comprising at least one computer having a network connection to receive at least one said DRM-protected multimedia data stream, program memory, working memory, and a processor coupled to said program memory, working memory, wherein said program memory stores processor control code for a media player for said multimedia data stream and code to control said processor to: play said DRM-protected multimedia data stream to provide at least a decrypted video data output stream for display on a monitor; capture still image data from a succession of still images from said video data output stream; process said still image data to detect greater than a threshold difference between at least two of said still images; and output fault data identifying a potential video quality fault responsive to absence of detection of greater than a threshold difference.

In embodiments, processing captured still images provides a number of advantages including compliance with DRM restrictions, and a reduced processing load. Successive images may be captured at intervals of between 1 second and 60, 30, 20, 10 or 5 seconds, for example every 3 seconds. Capturing images at this rate is useful because even where a scene is relatively static, for example talking heads or a game of tennis, the image is likely to change over this time frame.

In one embodiment of the method a time slice of the video data output stream is captured, the time slice having a duration of, for example, between 10 seconds and 5 minutes, and this time slice is divided into a set of still frames. Then one of these frames, for example the first frame, is chosen as a reference and the other frames within the time slice are compared with this reference frame. The number of frames which are different to this reference frame (in particular different by more than a threshold quantity; the skilled person will understand that this difference may be computed in any of a number of different ways) may then be counted to determine whether or not the video has frozen, or to identify other potential faults.

Preferably the system is also configured to detect a still or moving holding graphic or 'slate'. Such a slate is typically used by a program blackout management system (BMS) to block availability of certain programs in certain countries when accessed via the internet. Identification of the holding graphic may be performed by a range of different techniques depending upon the graphic—for example detecting a black border and/or detecting whether an average red/green/blue colour is within a range.

In preferred embodiments the system is configured to monitor a plurality of DRM-protected multimedia datastreams simultaneously. These may either comprise different channels, or they may comprise one channel 'broadcast' at a range of different bit rates, and hence video quality. Thus in a preferred implementation of the system a plurality of instances of the media player are implemented simultaneously, each producing a decrypted video output, and these video output streams are combined as if for display on a single monitor, each video stream appearing in a separate window on the monitor, for example in a grid pattern. (There is, however, no need for an actual video monitor to be present). In this way a single motion detection module or procedure may be employed to process the set or grid of images simultaneously and, if a fault is detected, the separate streams can be interrogated individually to determine in which stream the fault is present.

Preferred implementations of the system also include an audio quality monitoring system for monitoring a plurality of (DRM-protected) audio portions of multimedia data streams simultaneously. One problem with audio monitoring is that, unlike the multiple video streams described above, the audio streams cannot be separated "spatially". Moreover in a computer architecture playing multiple audio streams simultaneously will generally result in a single, combined audio stream. In the case of DRM-protected multimedia data streams, however, because these are encrypted it can be difficult to separate the audio from the video. Thus in a preferred embodiment the system includes code to select audio from a single one of the audio data streams by inhibiting or muting audio in the other data streams, in particular, by controlling a mute function of each of the media players. Such a mute function is generally provided by a media player and can be used to, in effect, demultiplex a single audio stream for further processing.

In one embodiment code to process a single audio stream to identify an audio fault may comprise code to detect differences between peaks and troughs in an average signal level. More particularly, the code may determine whether there is greater than a threshold difference between a signal level peak and trough, measured over a time interval. If such a variation in audio signal level is detected the audio can be assumed to be present, but if no such variation is detected a potential audio fault can be flagged. In embodiments the time interval or slice over which the variation in audio signal level is determined may be the same duration as a time slice of video or, for example, the duration between captured still images.

Thus in a related aspect the invention provides a system for monitoring the quality of DRM-protected multimedia data streams, the system comprising at least one computer having a network connection to receive at least one said DRM-protected multimedia data stream program memory, working memory, and a processor coupled to said program memory and working memory, and wherein said program memory stores processor control code for a media player for said multimedia data stream and code to control said processor to: play a plurality of said DRM-protected multimedia data streams simultaneously each using a respective said media player to provide a decrypted audio data stream from each said DRM-protected multimedia data stream; wherein said audio data streams are combined into a common audio output data stream; and wherein said code further comprises code to: select audio from one of said audio data streams in said common audio output data stream by muting audio in the other said audio data streams; process said selected audio in said common audio output data stream to identify an audio fault; and output fault data responsive to identification of the existence of said audio fault.

In preferred embodiments of the systems described above, because media players can be susceptible to stalling due to memory leaks, a media player is re-started at intervals, for example of between 1 minute and 30 minutes and/or after a timeout of a response from the media player has been identified. This helps to ensure robust operation of the system for long periods of unattended use. The skilled person will appreciate that any or all of a range of standard media players may be implemented including, for example, Windows Media Player (Trade Mark), Adobe Flash Player (Trade Mark), and many others.

In some preferred approaches the system is implemented as a client-server system. Thus the client may implement a set of media players and capture a grid of images at intervals, storing the captured still images, and also segments of audio data, to shared storage for the client-server system. The server may schedule jobs for the client and, in embodiments, performs at least the motion detection processing of the captured still images, as this is an efficient use of the available processing capacity. In embodiments the server may also send a message to an operations centre on detection of a potential fault, identifying the relevant multimedia stream. Preferably the system also stores historical data, preferably including fault detection data (audio and video) in combination with channel identification, bit rate data, time/date data, time slice identification data, and, preferably, segments of captured audio and/or video and/or still image data.

Preferably the system provides a user interface to facilitate access to this information. Storing the multimedia data in which a potential fault has been identified is useful as it enables immediate or later checking to determine whether a fault exists, and provides evidence of the presence/absence of a fault which may be reported, for example, to the content provider.

Thus in a related aspect the invention provides a server, for monitoring the quality of DRM-protected multimedia data streams, the server comprising at least one computer having a network connection to communicate with a client, program memory, working memory, and a processor coupled to said program memory and working memory, and wherein said program memory stores processor control code to control said processor to: communicate with said client to play a said DRM-protected multimedia data stream to provide at least a decrypted video data output steam for display on a monitor; receive from said client captured still image data from a succession of still images from said video data output stream; process said still image data to detail greater than a threshold difference between at least two of said still images; and output fault data responsive to absence of detection of said greater than a threshold difference.

In a further related aspect the invention provides a client, for monitoring the quality of DRM-protected multimedia data streams, the client comprising at least one computer having a network connection to communicate with a server and to receive at least one said DRM-protected multimedia data stream, program memory, working memory, and a processor coupled to said program memory and working memory, and wherein said program memory stores processor control code for a media player for said multimedia data stream, and code to control said processor to: receive from said server an instruction to play a said DRM-protected multimedia data stream; play said DRM-protected multimedia data stream to provide at least a decrypted video data output stream for displaying on a monitor; and output to said server captured still image data from a succession of still images from said video data output stream, for identifying a potential video quality fault.

In embodiments the server and/or client constructs a list of streams to be checked having a priority order, where the priority order is determined by prioritising a stream for which an error was identified or for which an error threshold was reached, in a previous cycle of checking the list of streams. In embodiments a priority list or queue may be constructed and/or stored at the server and/or client by identifying one or more streams in which an error was identified or for which an error threshold was reached. This priority list or queue may then be employed to determine a list of streams for subsequent checking.

The invention further provides a method of monitoring the quality of a multimedia data stream provided over the internet, the method comprising: playing said multimedia data stream to provide at least a video data output steam for display on a monitor; operating on data from said video data output stream using a motion detection procedure; identifying a potential video quality fault in said multimedia data stream responsive to an output of said motion detection procedure.

The invention further provides a computer readable medium including processor control code to implement the above-described systems and methods, for example on a general purpose computer system or on a digital signal processor (DSP). The code is provided on a physical carrier such as a disc, CD- or DVD-ROM, programmed memory such as non-volatile memory (e.g. Flash) or read-only memory (Firmware). Code (and/or data) to implement embodiments of the invention may comprise source, object or executable code in a conventional programming language (interpreted or compiled) such as C, or assembly code. As the skilled person will appreciate such code and/or data may be distributed between a plurality of coupled components in communication with one another.

BRIEF DESCRIPTION OF THE DRAWINGS

These and other aspects of the intention will now be further described, by way of example only, with reference to the accompanying figures in which.

DETAILED DESCRIPTION OF PREFERRED EMBODIMENTS

We will describe a system for monitoring the quality of DRM-protected multimedia data streams that mimics end user behaviour by playing the video stream on screen at each respective available bit rate. In broad terms, the system has access to a list of data streams to check and these are played for a time interval and the video displayed in a grid comprising multiple streams. During the monitoring period, screen shots are taken and audio samples of each stream are captured for archiving. The screen shot files are processed and screen shots are compared using motion detection algorithms to detect loss of video and still-image faults.

In embodiments the AForge.Net framework (http://www.aforgenet.com/framework/), published under the LGPL v3 license, is used as a library of motion detection code. In embodiments NAudio (http://naudio.codeplex.com/), published under the Microsoft Public License (Ms-PL), is used to capture audio and perform sound detection.

The system detects potential faults with the video and audio and provides alerts to the operational staff, in embodiments using email, so that they can employ a human check of the potentially faulty data streams. This reduces the burden on the operational staff as only selected streams are reported for checking by human intervention. In embodiments the system flags potential issues in the video delivery by mimicking the end user experience, reporting these issues for human verification. The system also stores results of previous checks for archival purposes.

Figure 1:
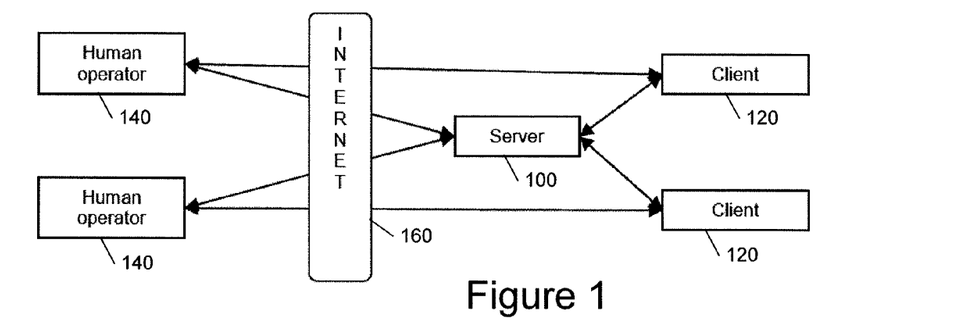
FIG. 1 shows the architecture of a system for monitoring the quality of DRM-protected multimedia data streams according to an embodiment of the invention.

Referring now to FIG. 1, this shows the architecture of a system according to an embodiment of the invention. The system comprises the server 100 in communication with a plurality of clients 120, typically though not essentially separate machines. Human operators 140 interact with the data on the server and clients over a network, in this example the Internet 160. Broadly speaking the server assigns multimedia data streams at different bit rates to clients which play their assigned data streams (video) using a media (video) player. Captures images and audio samples are stored in the client machines. The server hosts a website that shows summary statistics of the data stream monitoring, and sends alerts by email.

Figure 2A:
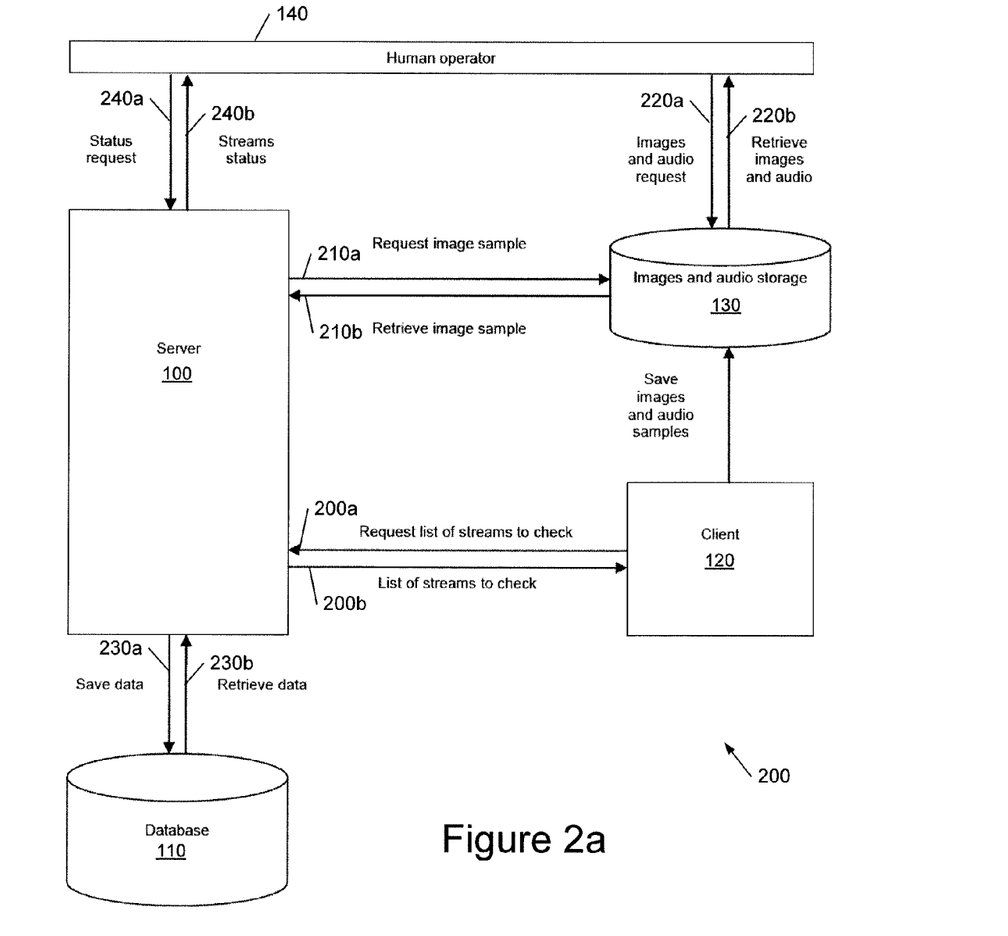
FIGS. 2a and 2b show details of a system for monitoring the quality of DRM-protected multimedia data streams according to an embodiment of the invention.

Referring now to FIG. 2a, this shows details of an embodiment of a system 200 for monitoring the quality of DRM-protected multimedia data streams. FIG. 2a illustrates high level communications between the server 100, a client 120, and a human operator 140. The system also includes a database 110 coupled to server 100, for storing statistical and other data, and a database 130 coupled to client 120 for storing captured still images, for example in .JPG format, and captured audio, for example in .WAV format. In embodiments database 120 stores data such as channel, speed, license URL, media (video) URL, number of errors, the last check time, the last error time and so forth.

The server 100 manages the system and maintains a list of all streams to validate, for example defined as part of a user configuration procedure, and a record of previous checks. Every 30 seconds each client node connects to the server and the server receives a request 200a for a list of streams to check and provides 200b a list of streams to be checked back to the client. When the client node connects it provides the gathered data on the previously checked streams to the server as well as requesting another list of streams to check. Each client/node has a predetermined list of streams to check and the server returns a list of streams to each node in a loop.

The client checks the audio streams and determines whether or not a particular stream is "good" (i.e. without detected errors) but the server analyses the stills from the captured video to determine whether or not the video of a stream is good. Thus the server is able to request 210a an image sample from client database 130 and to retrieve 210b an image sample from this database, in embodiments in the form of a filmstrip, as described later. The human operator 140 is also able to interrogate database 130, via a network connection (web interface), in particular to request 220a images and/or audio and to retrieve 220b these images/audio. This allows the human operator to drill down to investigate details and potential causes of an identified fault.

The server saves 230a data relating to the monitored multimedia data streams into database 110 for later retrieval 230b for responding to a status request 240a from human operator 140 with status data 240b on the monitored streams.

In embodiments the server as Microsoft Internet Information Services (IIS) (registered trade mark) installed and presents a dashboard with gathered results to a human operator 140. The server is also configured to send an email to a human operator when a monitored stream indicates a potential fault, more particularly when a count of a number of errors exceeds a predetermined threshold.

In some preferred embodiments the server 100 also has a communication link with a Blackout Management System (BMS) (not shown in FIG. 2a), for example via a network. A Blackout Management System controls accessibility of a stream over the Internet, by displaying a holding graphic called a "slate" instead of the programme when a programme is not permitted to be streamed over the Internet. The main reason (but not the only reason) why a programme may not be streamed over the Internet is rights ownership—many TV stations purchase rights to show programmes only by satellite and thus during programmes which a data stream distributor has no right to stream over the Internet a slate or alternative programme must be shown. Thus in some preferred embodiments the server 100 periodically, for example every two minutes, connects to the Blackout Management System and requests a list of streams which have a slate. This can then be taken into account when determining whether or not to flag a potential fault on a data stream since, for example, a slate could appear as a frozen stream.

Figure 2B:
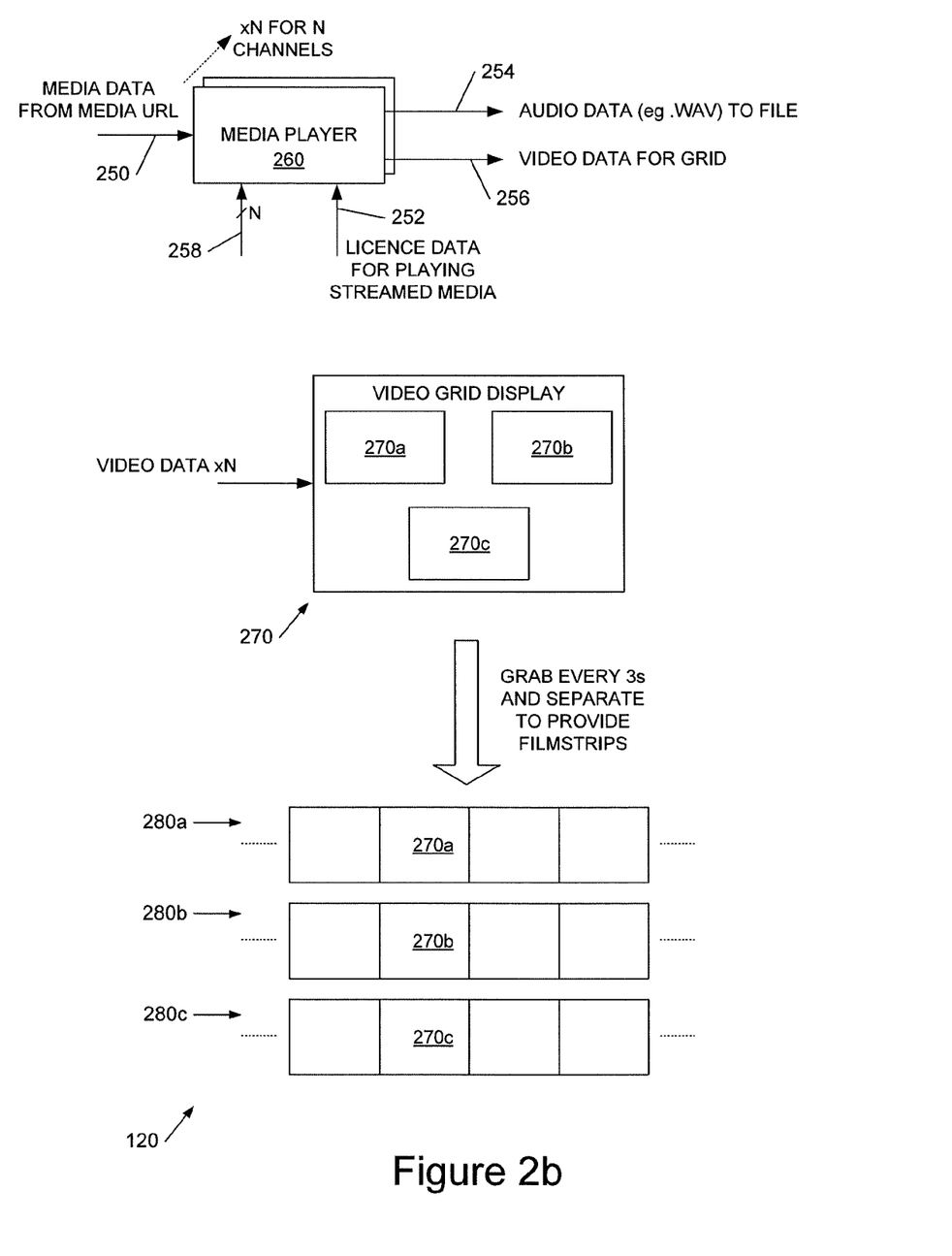

Referring now to FIG. 2b, this shows a schematic illustration of the multimedia data capture processes operating within client 120. Thus each multimedia data stream 250 is allocated a respective media player 260, which also receives license data 252 (from server 100) for playing the data stream. In embodiments a media player also has a mute control input 258 to mute the respective audio output 254 from the media player. Media player 260 may be implemented in either software or hardware or a combination of the two.

The output of media player 260 comprises audio data 254 and video data 256. The audio data is captured in segments and is written to a data file; the video data is combined with video data from other multimedia data streams into a grid format 270 (although this need not be physically displayed on a display). A client has a plurality, N, of media players 260 and the N video data streams are combined into the video grid display 270. At intervals, for example every three seconds, a frame of display 270 is captured, comprising captured frames of, in this example, three separate video streams 270a,b,c. These are separated and assembled into three separate filmstrip-type images 280a,b,c each comprising a set of captured frames from a single respective multimedia data stream, conveniently organized in a line defining a time sequence of the captured frames. In embodiments it is preferable, though not essential, to combine the time-series captured frames of a single multimedia data stream into a single still image, for ease of processing, and also to facilitate storage and display to a human operator on request. In embodiments these "filmstrips" form the basis of subsequent processing to determine whether or not there is a potential fault in a video data stream. Details of a preferred approach for such fault detection are described later.

When a check on a multimedia data stream fails then that stream raises an error. A priority queue is managed by each client node. This queue holds a list of failed streams to be rechecked as soon as possible to confirm the failure. In embodiments the priority queue is managed by the server, and in a client node 120 a prioritized multimedia data stream may be allocated to a notional "first" multimedia player. A user alert may be provided when a predetermined number of errors is reached, for example by sending an email as previously described.

Figure 3:
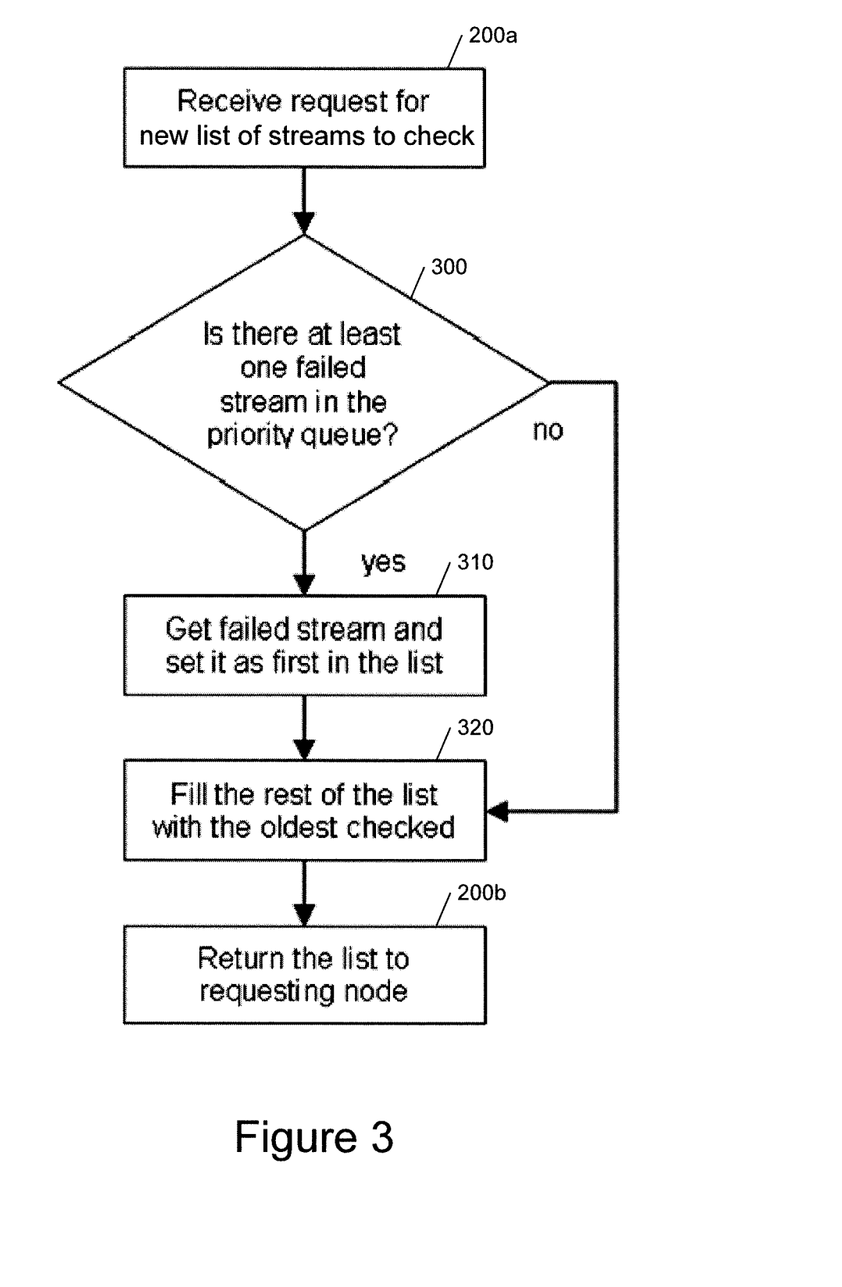
FIG. 3 shows a flow diagram of a procedure for prioritizing monitoring of a DRM-protected multimedia data stream according to an embodiment of the invention.

Referring now to FIG. 3, this shows a flow diagram of a procedure for generating a prioritized list of multimedia data streams for a process on a client node to check. In embodiments the procedure of FIG. 3 is implemented on server 100 and thus at step 200a the server receives a request for a list of new streams to check. The server then determines 300 whether or not there is at least one failed stream in the set of streams to check and, if so, sets the failed stream as first in the list to return (step 310). Then, or if there are no failed streams in the previous checked list, the procedure pulls the rest of the list starting with the oldest checked stream (step 320). Where there are multiple failed streams these may be prioritized by the number of errors identified in a stream. Once the full list has been constructed this is returned 200b to the requesting client node.

Figure 4:
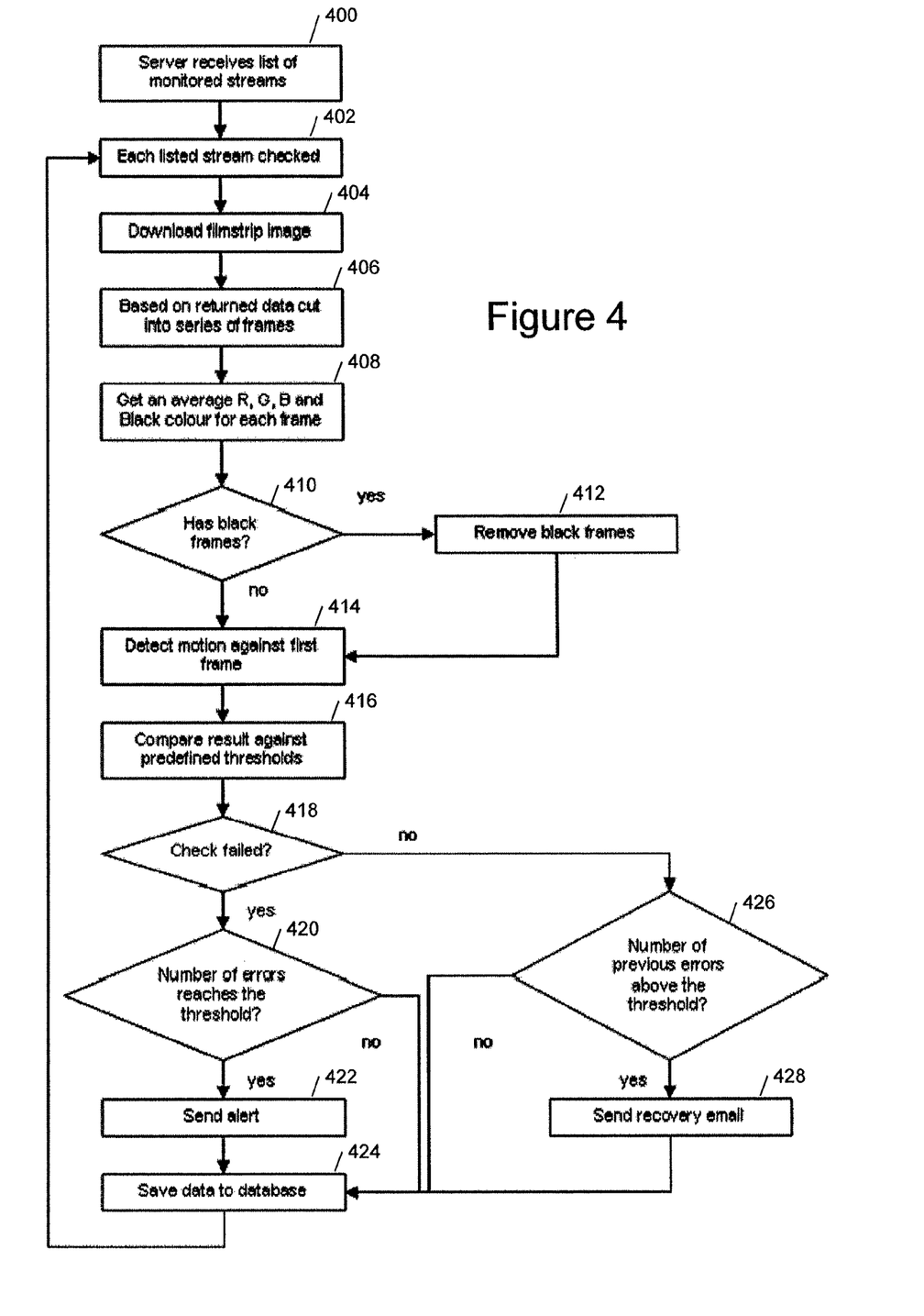
FIG. 4 shows a flow diagram of a procedure for identifying video errors in a multimedia data stream, according to a preferred implementation of the present invention.

Referring now to FIG. 4, this shows an example of a procedure which may be implemented on server 100 to process a filmstrip 280 of the type shown in FIG. 2b to identify potential faults and to provide statistical data for storing in data base 110 for later use by a human operator. Thus initially the server receives a list of streams to be monitored (step 400), for example defined during a set up procedure. Each listed stream is checked 402 by a client and a filmstrip type image is stored in database 130 for each checked stream, and afterwards the video integrity of each stream is checked by server 100 using the saved filmstrip images. Thus the server downloads a filmstrip image 404 and cuts the retrieved image into a time series of frames 406. Each captured video frame of the series is then processed to determine an average red, green, blue and black value for the frame (step 408). In embodiments a black colour value is determined from a sum of red, green and blue colour values and a black colour may be identified as a colour in which such a sum is less than a predetermined value, for example 10. In embodiments the system is configured to ignore black frames. Thus using this data the procedure determines (410) whether there are any substantially entirely black frames and if so these are removed (412). Motion detection for each frame is then performed against the first frame (or against an immediate predecessor frame), at step 414. The skilled person will appreciate that there are many ways to perform such motion detection; software as described previously may be employed or there may be a simple sum of pixel difference values with a threshold, or the average colour values determined in step 408 may be employed for motion detection. In each case, however, there is a comparison of a motion detection value or values against one or more predetermined or user-defined thresholds (416).

The system then determines whether or not the motion detection check failed (418), there being an assumption that if motion is not detected for a period of time then there is a potential video fault. However a single motion detection fault is not, of itself, determinative since certain types of image can give rise to force positive error detection, for example talking heads. Thus if the check at step 418 fails the system determines whether or not the number of errors has reached a threshold (420), if so sending an (email) alert 422, and if not updating the data for the checked multimedia stream in database 110 (step 424).

If the check at step 418 was passed, the system then checks whether or not a number of previous errors on the data stream was above the threshold (step 426) and if so the system provides a user alert that there has been recovery from a previous error in the data stream, for example by sending a "recovery" email (step 428). If the number of previous errors was not above the threshold, the stream was previously good and is still good and thus the system continues with step 424, saving data relating to the check performed in the database, and then looping back to step 402 to check the next stream in the list.

Figure 5:
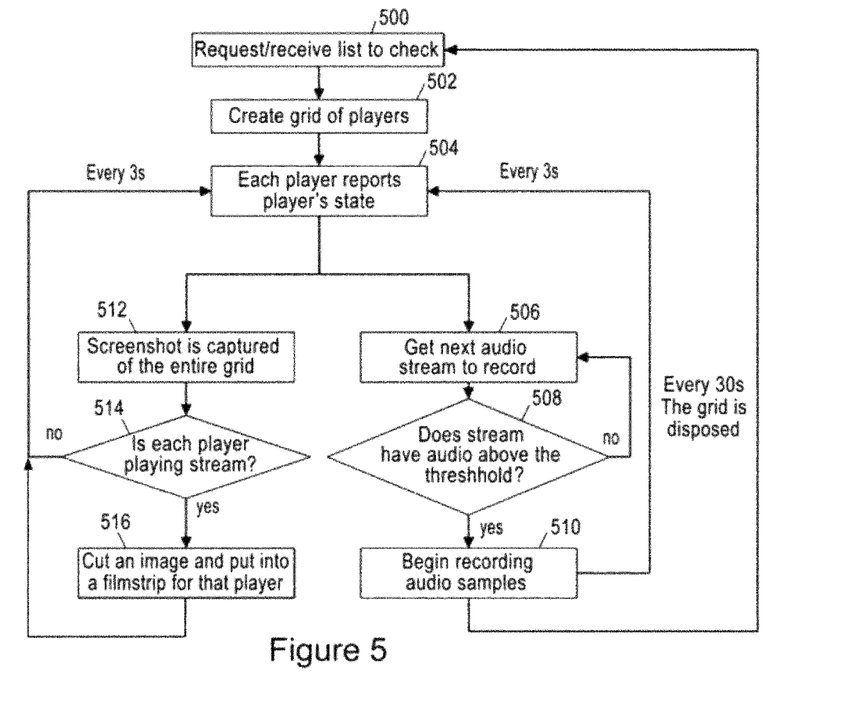
FIG. 5 shows a flow diagram of a client procedure for checking a plurality of multimedia data streams according to an embodiment of the invention.

Referring now to FIG. 5, this shows a flow diagram of a procedure for checking a plurality of DRM-protected multimedia data streams for implementation on a client node 120. In embodiments a client node 120 comprises a designated computing device on which a client process is running, to play a plurality of ERM-protected multimedia data streams in a picture-in-picture grid of video displays as previously described.

In embodiments each client node runs in a 13 second loop, every 30 seconds sending a request 200a to the server 100 for a new list of streams to validate. Thus at step 500 the procedure requests and receives a list of multimedia data streams to check and, using this, sets up a plurality of media players to play some (but not necessarily all) of the listed streams in parallel, constructing a grid of the video outputs of the players so that they can be displayed/captured in a common frame (step 502). This approach enables substantially any media format to be monitored including (but not limited to) Windows Media, Silverlight Smooth Streaming, Adobe Flash, Apple HTTP Streaming (all registered trade marks), and so forth. License data for playing the listed media streams may either be obtained by the server 100 or directly from a license URL (which may be supplied, for example, via the server 100). In embodiments the system constructs the player video grid whilst each player begins connecting to its respective media stream. The client node also monitors and reports each player's state (step 504) back to server 100 for logging. The possible states are dependent upon the format of the multimedia data stream and the media player technology and DRM protection, but in general a player will report the following events:
Acquiring License
Buffering
Closed
Individualizing
Opening
Paused
Playing
Stopped
Error The procedure of FIG. 5 has, broadly speaking, two loops, one for audio capture and a second for video capture. In the audio capture loop the procedure identifies the next audio stream to record (step 506) and selects a single audio stream from the set of audio streams available from the N players by, in embodiments, controlling the audio mute controls 258 (FIG. 2b) of the players to mute all but the audio stream of interest. This is useful because, in general, a computing device will have only a single audio path (albeit this may be stereo or have more than two channels) and because the DRM protection makes it difficult otherwise to separate out the respective audio outputs of the media players when these are playing in parallel. The system then performs a check on the selected audio stream (step 508). This may, in embodiments, simply comprise a check that a peak value of the selected audio stream is greater than a threshold level, if so this confirming that audio is present. In embodiments this peak audio value data is provided to server 100 (as XML data). If the stream does not have audio above the threshold level the procedure loops back to step 506 to retrieve the next audio stream; otherwise the procedure begins capturing a sample of the selected audio stream. In embodiments a three second sample of each audio stream is recorded.

The video capture loop runs in parallel with the audio capture loop and, at step 512, the procedure captures a screen shot of the entire video grid 270 (in FIG. 2b). In embodiments this is performed at time intervals corresponding to the audio capture time intervals, for example every three seconds. For each player in the grid that is playing a media stream (step 514) the procedure cuts a screen shot for that player from the video grid display and assembles this into a filmstrip image for the player (step 516). Thus referring back to FIG. 2b, each of images 270a,b,c is assembled into a respective filmstrip 280a,b,c, for each player that is playing a stream. The image for a particular player may be extracted from the captured video grid screen shot based upon the player's known position in the grid. The captured sequence of images forming a filmstrip may be stored as separate images in a time sequence but, in embodiments, these are combined into a single image for storage. In embodiments the captured images from each player are initially saved into an array and then at the end of the (30 second) loop these captured images are arranged side-by-side in a linear fashion, in the manner of a filmstrip. The filmstrip image for each player is stored in database 130, together with the corresponding captured audio.

Thus, broadly speaking, every three seconds a snap shot of the entire grid of players is taken and audio capture is initiated for the next stream which meets the audio threshold. Due to a combination of DRM protection and hardware and software limitations typically only a single audio stream can be captured at a time because DRM protection allows the audio stream of the media only to be played in a media player, protecting the stream to inhibit direct access to the audio (or video) stream. Thus in embodiments the audio is captured from a sound card of the computing device (the relevant function may go under a variety of names, for example "Stereo Mix", "Record What You Heard", or "Waveout Mix").

At the end of the 30 second loop statistical information is collated and reported for each player including, for example, player events as described previously, and the filmstrip-type images 280 are created.

In embodiments a client is managed by one or more scheduled tasks. In particular, in preferred implementations the client software is restarted at intervals, for example every five minutes, by a scheduled task. This is because third party media player code can be unstable and thus restarting at intervals helps to ensure continuous and uninterrupted functionality.

In embodiments a new folder in database 130 is created each day for images and audio samples. Conveniently this folder is made accessible via HTTP to facilitate access by server 100 and human operator 140. In some preferred implementations a further scheduled task runs daily to delete folders older than a time limit, for example 14 days. This helps to control the very large quantity of image and audio sample data which rapidly accumulates and, in general, there is no need to store data longer than around 1-2 weeks. Archiving for up to 1-2 weeks is, however, advantageous in providing an audit trail for multimedia stream distributors to be investigated when, for example, streaming faults occur.

As well as a client monitoring scheduled task to restart the client every few minutes, for example every five minutes, and a folder delete scheduled task to delete image and audio sample data older than 14 days, preferably the client node is provided with a license handling scheduled task to download all licenses needed for the monitored multimedia data streams at intervals, for example every four hours. These may include, for example, all licenses for Windows Media Video (registered trade mark) needed and all other licenses needed to play the DRM-protected multimedia data streams. To access media protected by DRM a license needs to be delivered, and for Windows Media Video this license is required in advance. Conveniently, therefore, licenses for these played streams can be accessed periodically by a scheduled task as described. Other media formats, for example Silverlight Smooth Streaming and Adobe Flash (registered trade marks) need direct access to the licensing server to play their media data streams. Thus in embodiments one or more players are provided with a link to an appropriate licensing server, for example and Internet connection, to enable license data 252 (FIG. 2*b*) to be delivered.

In embodiments a client node 120 is implemented using either a standard PC or a server with a sound card. The software can run adequately on a standard PC (personal computer), but the number of simultaneously checked streams is limited by the CPU, PPU, the bandwidth, and the sound card-imposed limitation of only being able to check one audio channel at a time. The available communications bandwidth can significantly impact performance, and in particular because of the relatively short checking loops (30 seconds) insufficient bandwidth can cause extensive buffering and can impact the number of reported alerts. Thus, preferably, the available communications bandwidth for a client is increased until this does not occur. An embodiment of the system was implemented using Windows, .Net 4.0 framework, an IIS server, Windows Media Player and Internet Explorer with a Silverlight plug-in and an Adobe Flash Player plug-in (all registered trade marks).

In preferred implementations the server 100 provides a system dashboard view for operator 140. In embodiments the dashboard is used to provide an operator with an overview of the entire system, as well as an archive view of the last checked streams.

Figure 6:
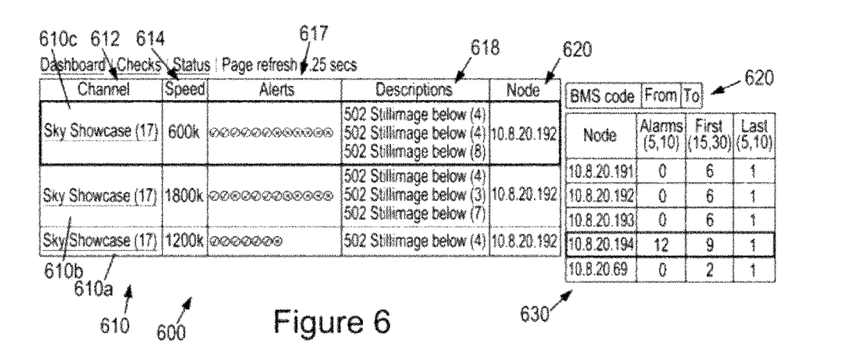
FIG. 6 shows an example user interface display for a multimedia data stream monitoring system according to an embodiment of the invention.

FIG. 6 shows an example of the system dashboard 600, used to provide a summary of the checks that are done in real time; this page refreshes itself every 30 seconds.

Referring to FIG. 6, the dashboard comprises three main regions, an error summary region 610, a BMS summary region 620, and a node summary region 630. The error summary region shows the monitored channels 612, the respective channel speed (in bits per second) 614, and a region 616 showing a time series of recent errors, for example as tick/cross icons. Region 617 shows descriptions for a short history of recent errors (for example "still image"), and region 618 shows the IP address of the monitoring client node. Region 610 may be colour coded according to the number of failed checks, in the illustrated example regions 610*a,b,c* having respective colours grey, yellow, red with increasing numbers of detected errors.

The BMS summary region 620 shows (when expanded) scheduled slates in each channel. The nodes summary region 630 shows statistical information regarding each client node machine, in particular the node IP address, the number of alerts per node, the number of minutes which have passed since the earliest check, and the number of minutes which have passed since the most recent check.

Figure 7A:
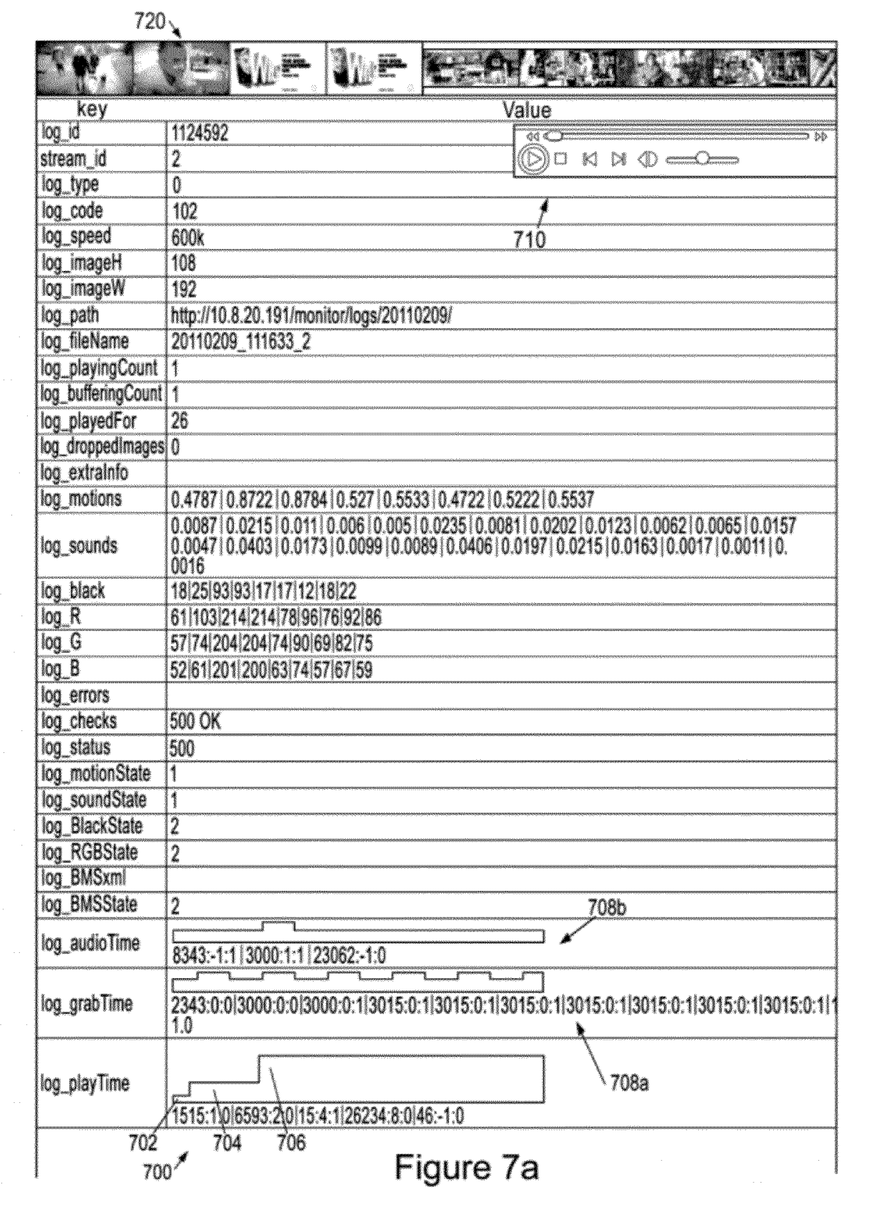
FIGS. 7a and 7b show example status page displays of a user interface for the system displaying, respectively, a detailed data stream monitoring view, and a historical data stream monitoring view.

The dashboard provides useful information but is not necessary determinative—for example a quiet tennis match may successively fail an audio threshold measurement but nonetheless still be operating correctly. Thus preferred embodiments of the system also enable an operator to drill down to interrogate more detailed information on an error, for example by clicking the tick/cross icon in the dashboard view. Thus FIG. 7*a* illustrates an example status view 700, which shows details of historical checks on a multimedia data stream, giving details on each check, and also enabling a user to go back earlier in time to review the results of a previous check.

Example data which may be included in such detailed view includes an identifier for the log, and stream, a bit rate, image dimensions (height and width), a log path and file name, a duration ("playedFor") field indicating the duration of the loop in seconds, and error information. The error information may include a count of dropped images, motion detection values for each three second point, sound threshold values for each stream for each three second point, average black, red, green and blue values for each three second point, a count of a number of checks and errors, and data relating to operation of a media player. In the illustrated example the video play sequence is illustrated by a stepped graph with different height regions 702, 704, 706 illustrating when the media player is, respectively, connecting, buffering and playing. Likewise further reasons of the display 708*a,b* illustrate when the system is capturing video and audio respectfully, showing corresponding time intervals in milliseconds. Clicking on an audio region of the display brings up an audio player 710 to enable the captured audio to be reviewed, and a region 720 displays the film strip constructed from the captured video phones. As mentioned, the detailed status data shows when the video images and audio sample(s) were captured.

Figure 7B:
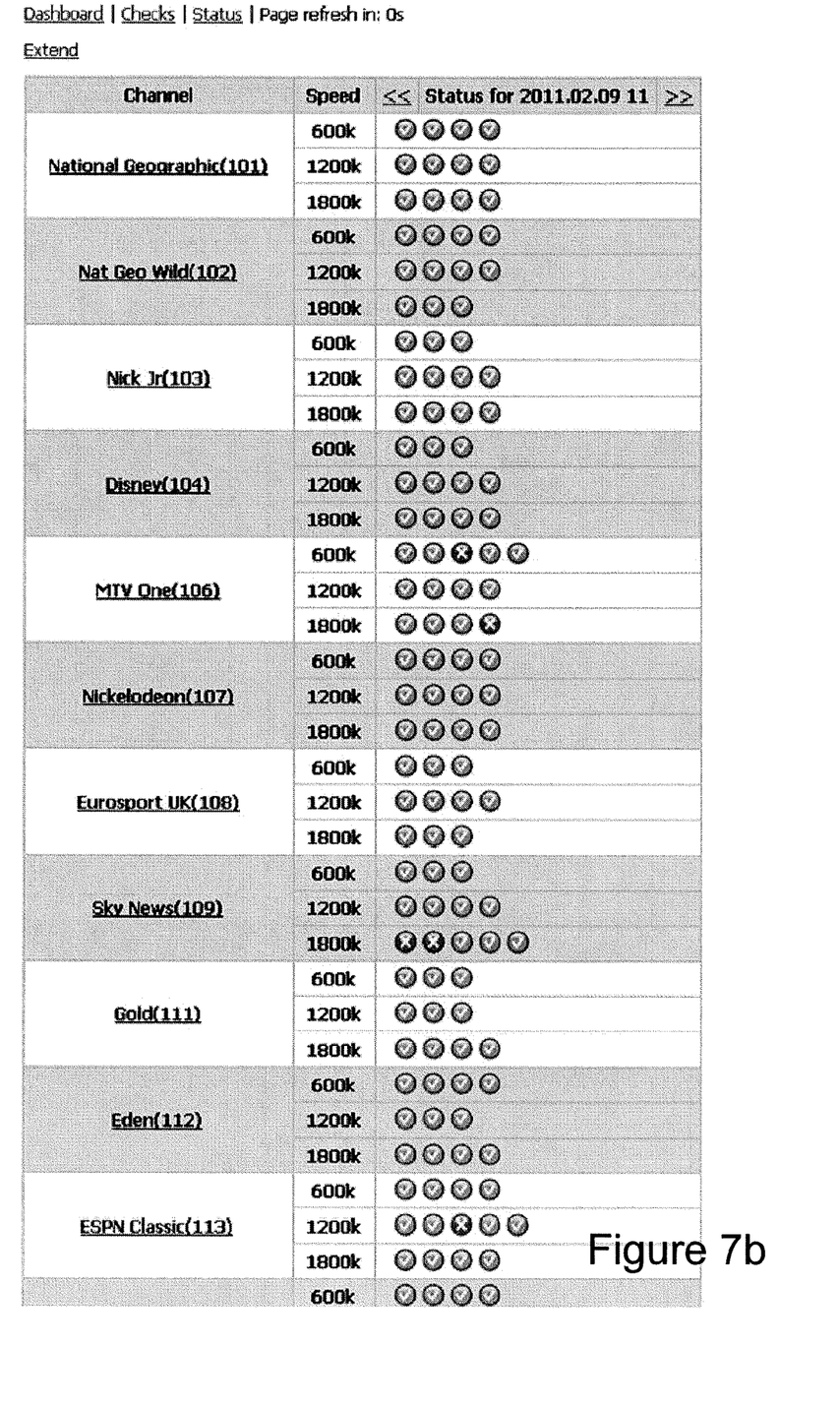

FIG. 7*b* illustrates an example historical status view 750 showing (in this example) checks made on a set of multimedia data streams during a selected time period, in the example one hour. This display combines checks for all the different delivery bit rates for each programme, and thus facilitates identification of whether a fault is specific to just one bit rate or to the entire programme, across all the bit rates. This display also facilitates comparing delivery hour-by-hour.

Figure 8:
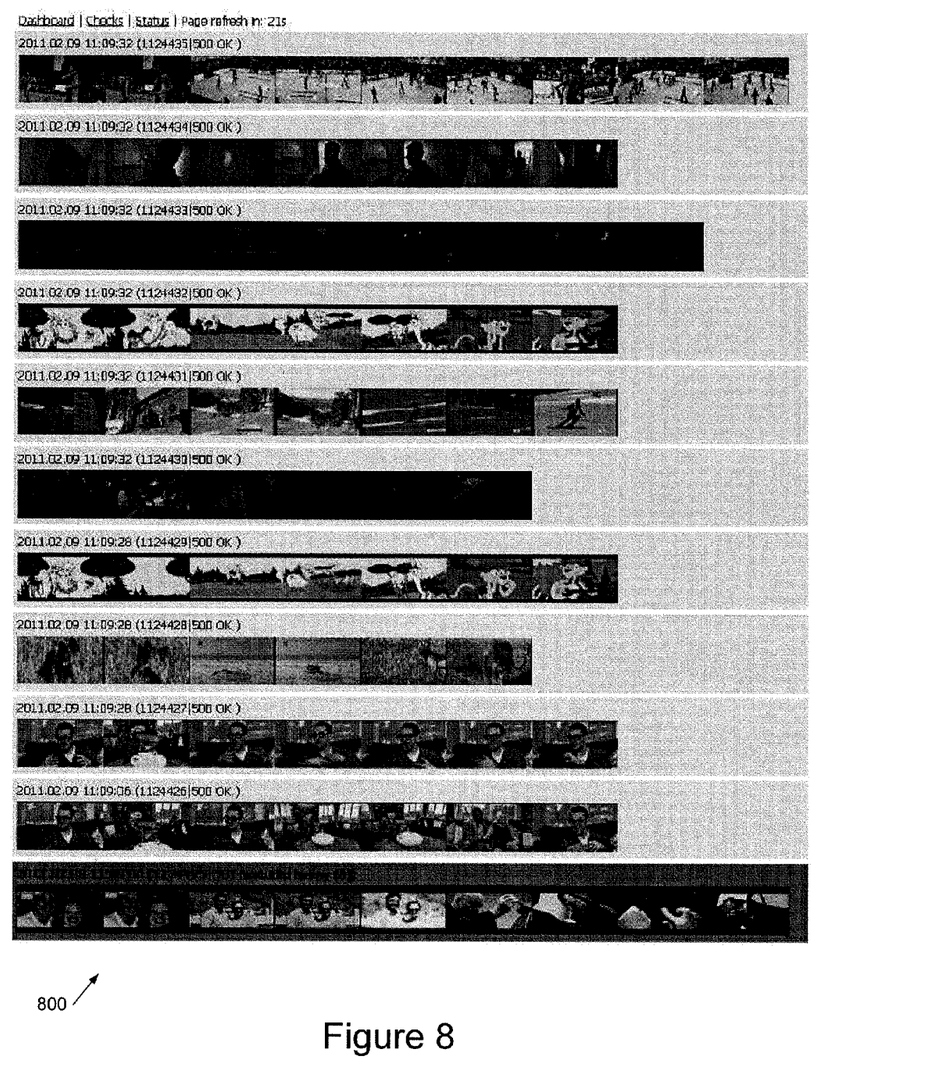
FIG. 8 shows a filmstrip view of a user interface for a system for monitoring the quality of multi media data streams according to an embodiment of the invention.

Referring now to FIG. 8, this shows an example filmstrip page 800 provided by a preferred embodiment of the system. This page displays a set of filmstrips for a corresponding set of monitored channels, together with error status data, above the filmstrip and also flagged by a change in filmstrip background colour (the background of the bottom filmstrip is highlighted). In embodiments the filmstrip view shows a set of recent checks, for example the last 50 checks performed by the system, and in embodiments this page refreshes itself every 30 seconds. In embodiments clicking on a filmstrip opens a detailed view of the type shown in FIG. 7*a*.

No doubt many other effective alternatives will occur to the skilled person. For example, where a single server, client or computing device is shown, it is expressly contemplated that its function can be distributed among a plurality of interconnected computing or processing devices that are locally interconnected or separated by a network link. It will be understood that the invention is not limited to the described embodiments and encompasses modifications apparent to those skilled in the art lying within the spirit and scope of the claims appended hereto.

I claim:

1. A system for monitoring the quality of DRM-protected multimedia data streams, the system comprising at least one computer having a network connection to receive at least one said DRM-protected multimedia data stream, program memory, working memory, and a processor coupled to said program memory, working memory, wherein said program memory stores processor control code for a media player for said multimedia data stream and code to control said processor to:

play said DRM-protected multimedia data stream to provide at least a decrypted video data output stream for display on a monitor;

capture still image data from a succession of still images from said video data output stream;

process said still image data to detect greater than a threshold difference between at least two of said still images; and output fault data identifying a potential video quality fault responsive to absence of detection of greater than a threshold difference.

2. A system as claimed in claim 1 wherein said code comprises code to:

play a plurality of said DRM-protected multimedia data streams simultaneously, each said stream using a respective said media player, to provide a decrypted video data output stream defining a corresponding plurality of moving video images, one for each said multimedia data stream, in different locations on a common display;

wherein said code to capture said still image data comprises code to capture a separate succession of said still images from each said moving video image, wherein said moving video images are separated by said different locations on said common display; and wherein said code to process said still image data and to output said fault data is configured to operate on said still images from each of said DRM-protected multimedia data streams.

3. A system as claimed in claim 2 wherein a said media player further provides a decrypted audio data stream from a played said DRM-protected multimedia data stream;

wherein said audio data streams from playing said DRM-protected multimedia data streams are combined into a common audio output data stream; and wherein said code further comprises code to select audio from one of said audio data streams in said common audio output data stream by muting audio in the other said audio data streams.

4. A system as claimed in claim 3 wherein said code to select said audio comprises code to control a mute function of said media players of said multimedia streams to select a single source of said audio from said audio data streams in said common audio output data stream.

5. A system as claimed in claim 3 wherein said code further comprises code to process said selected audio in said common audio output data stream to identify an audio fault; and wherein said output fault data identifies existence of said audio fault.

6. A system as claimed in claim 5 wherein said code to identify said audio fault comprises code to identify the absence of greater than a threshold difference in signal level over a sample period of said common audio output data stream.

7. A system as claimed in claim 5 wherein said code to select said audio is configured to select audio in each said audio data stream in turn omitting audio from an audio data stream in which a said audio fault has previously been identified as being absent.

8. A system as claimed in claim 1 wherein said code to process said still image data comprises video motion detection code.

9. A system as claimed in claim 1 wherein said code to process said still image data comprises code to identify a still or moving image characteristic of operation of a broadcast program blackout management system.

10. A system as claimed in claim 1 wherein said code further comprises code to restart said media player at intervals to control memory leaks.

11. A server for the system of claim 1, for monitoring the quality of DRM-protected multimedia data streams, the server comprising at least one computer having a network connection to communicate with a client, program memory, working memory, and a processor coupled to said program memory and working memory, and wherein said program memory stores processor control code to control said processor to:

communicate with said client to play a said DRM-protected multimedia data stream to provide at least a decrypted video data output stream for display on a monitor;

receive from said client captured still image data from a succession of still images from said video data output stream;

process said still image data to detail greater than a threshold difference between at least two of said still images; and output fault data identifying a potential video quality fault responsive to absence of detection of said greater than a threshold difference.

12. A non-transitory, physical data carrier carrying processor control code for the server of claim 11, for monitoring the quality of DRM-protected multimedia data streams, said code comprising code to:

communicate with a client to play a said DRM-protected multimedia data stream to provide at least a decrypted video data output stream for display on a monitor;

receive from said client captured still image data from a succession of still images from said video data output stream;

process said still image data to detail greater than a threshold difference between at least two of said still images; and output fault data identifying a potential video quality fault responsive to absence of detection of said greater than a threshold difference.

13. A client for the system of claim 1, for monitoring the quality of DRM-protected multimedia data streams, the client comprising at least one computer having a network connection to communicate with a server and to receive at least one said DRM-protected multimedia data stream, program memory, working memory, and a processor coupled to said program memory and working memory, and wherein said program memory stores processor control code for a media player for said multimedia data stream, and code to control said processor to:

receive from said server an instruction to play a said DRM-protected multimedia data stream;

play said DRM-protected multimedia data stream to provide at least a decrypted video data output stream for display on a monitor; and output to said server captured still image data from a succession of still images from said video data output stream, for identifying a potential video quality fault.

14. A non-transitory, physical data carrier carrying processor control code for the client of claim 13, for monitoring the quality of DRM-protected multimedia data streams, said code comprising code to:

receive from a server an instruction to play a said DRM-protected multimedia data stream;

play said DRM-protected multimedia data stream to provide at least a decrypted video data output stream for display on a monitor; and output to said server captured still image data from a succession of still images from said video data output stream, for identifying a potential video quality fault.

15. A non-transitory, physical data carrier carrying processor control code for the system of claim 1 for monitoring the quality of DRM-protected multimedia data streams, said code comprising code to:

play a said DRM-protected multimedia data stream to provide at least a decrypted video data output stream for display on a monitor;

capture still image data from a succession of still images from said video data output stream;

process said still image data to detect greater than a threshold difference between at least two of said still images; and output fault data identifying a potential video quality fault responsive to absence of detection of greater than a threshold difference.

16. A system for monitoring the quality of DRM-protected multimedia data streams, the system comprising at least one computer having a network connection to receive at least one said DRM-protected multimedia data stream program memory, working memory, and a processor coupled to said program memory and working memory, and wherein said program memory stores processor control code for a media player for said multimedia data stream and code to control said processor to:
- play a plurality of said DRM-protected multimedia data streams simultaneously each using a respective said media player to provide a decrypted audio data stream from each said DRM-protected multimedia data stream;
- wherein said audio data streams are combined into a common audio output data stream; and
- wherein said code further comprises code to:
- select audio from one of said audio data streams in said common audio output data stream by muting audio in the other said audio data streams;
- process said selected audio in said common audio output data stream to identify an audio fault; and
- output fault data responsive to identification of the existence of said audio fault.

17. A system as claimed in claim 16 wherein said code to identify said audio fault comprises code to identify the absence of greater than a threshold difference in signal level over a sample period of said common audio output data stream.

18. A system as claimed in claim 16 wherein said code to select said audio is configured to select audio in each said audio data stream in turn omitting audio from an audio data stream in which a said audio fault has previously been identified as being absent.

19. A method of monitoring the quality of a multimedia data stream provided over the internet, the method comprising:
- playing said multimedia data stream to provide at least a video data output stream for display on a monitor;
- operating on data from said video data output stream using a motion detection procedure;
- identifying a potential video quality fault in said multimedia data stream responsive to an output of said motion detection procedure.

20. A method as claimed in claim 19 wherein said playing comprises:
- playing a plurality of said multimedia data streams simultaneously;
- forming a common video data stream in which video from said multimedia data streams play in separate windows of a common image frame; and
- wherein said motion detection procedure operates on said common video data stream.

21. A method as claimed in claim 19 further comprising:
- processing said video data output stream or said common video stream to capture a succession of still images from the stream; and
- operating on said captured still images using said motion detection procedure.

22. A non-transitory, physical data carrier carrying processor control code to implement a method of monitoring the quality of a multimedia data stream provided over the internet, said code comprising code to:
- play said multimedia data stream to provide at least a video data output stream for display on a monitor;
- operate on data from said video data output stream using a motion detection procedure;
- identify a potential video quality fault in said multimedia data stream responsive to an output of said motion detection procedure.

* * * * *